United States Patent
Kim et al.

(10) Patent No.: US 9,755,968 B2
(45) Date of Patent: Sep. 5, 2017

(54) METHOD AND APPARATUS FOR PROCESSING A SOME/IP STREAM THROUGH INTERWORKING WITH AVB TECHNOLOGY

(71) Applicants: HYUNDAI MOTOR COMPANY, Seoul (KR); Kia Motors Corporation, Seoul (KR); IUCF-HYU (INDUSTRY-UNIVERSITY COOPERATION FOUNDATION HANYANG UNIVERSITY), Seoul (KR)

(72) Inventors: Seung Su Kim, Seoul (KR); Seong Jin Park, Daejeon (KR); Woo Sub Kim, Namyangju-si (KR); Ho Yoo, Suwon-si (KR); Chung Hi Lee, Seoul (KR); Sung Kwon Park, Seoul (KR); Ju Ho Lee, Seoul (KR); Young Hwan Jeon, Yongin-si (KR)

(73) Assignees: HYUNDAI MOTOR COMPANY, Seoul (KR); KIA MOTORS CORPORATION, Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 96 days.

(21) Appl. No.: 14/705,776

(22) Filed: May 6, 2015

(65) Prior Publication Data

US 2016/0142303 A1 May 19, 2016

(30) Foreign Application Priority Data

Nov. 18, 2014 (KR) ........................ 10-2014-0160583

(51) Int. Cl.
*H04L 29/08* (2006.01)
*H04L 12/721* (2013.01)
(Continued)

(52) U.S. Cl.
CPC ........ *H04L 45/68* (2013.01); *H04L 29/08558* (2013.01); *H04L 47/72* (2013.01);
(Continued)

(58) Field of Classification Search
CPC ........ G06F 8/60; G06F 9/5044; G06F 9/5027; G06F 13/385; G06F 11/0739;
(Continued)

(56) References Cited

U.S. PATENT DOCUMENTS

2014/0133350 A1* 5/2014 Triess ................. H04L 41/0893
370/254

FOREIGN PATENT DOCUMENTS

KR 10-1008506 B1 1/2011
KR 10-2011-0012115 A 2/2011
(Continued)

OTHER PUBLICATIONS

Example for a Serialization Protocol (SOME/IP) AUTOSAR Release 4.2.1, Apr. 2014.*
(Continued)

*Primary Examiner* — Jae Y Lee
*Assistant Examiner* — Aixa Guadalupe-Cruz
(74) *Attorney, Agent, or Firm* — McDermott Will & Emery LLP (57) ABSTRACT

A method for processing a SOME/IP stream through interworking with Audio Video Bridging (AVB) in a server includes determining a transmission scheme for the SOME/IP stream through a SOME/IP service discovery procedure and generating an InitialEvent message and transmitting the generated InitialEvent message to a client according to the
(Continued)

determined transmission scheme. If the determined transmission scheme is L2-Frame, the SOME/IP stream is transmitted through a layer 2 of AVB. Therefore, a SOME/IP stream, the QoS of which is guaranteed through interworking with AVB, may be provided.

19 Claims, 5 Drawing Sheets

(51) Int. Cl.
    *H04L 29/06*     (2006.01)
    *H04L 12/911*     (2013.01)

(52) U.S. Cl.
    CPC ........ *H04L 65/4084* (2013.01); *H04L 65/607* (2013.01); *H04L 65/80* (2013.01); *H04L 67/12* (2013.01); *H04L 67/42* (2013.01); *H04L 69/16* (2013.01); *H04L 29/08* (2013.01); *H04L 29/08027* (2013.01)

(58) Field of Classification Search
    CPC ...... G06F 11/3013; H04L 67/12; H04L 67/42; H04L 45/66; H04L 67/104; H04W 24/02; H04W 4/046; H04W 80/085; H04W 84/18

See application file for complete search history.

(56) References Cited

FOREIGN PATENT DOCUMENTS

| KR | 10-1181100 B1 | 9/2012 |
|---|---|---|
| KR | 10-2013-0002948 A | 1/2013 |

OTHER PUBLICATIONS

"Specification of Service Discovery", AUTOSAR Release 4.2.1. Oct. 2014.
Mann, E. et al., "AVB Software Interfaces and Endpoint Architecture Guidelines" AVnu Alliance Best Practices Revision 1.0. Dec. 19, 2013.
Korean Office Action dated Nov. 20, 2015, issued in corresponding Korean Application No. 10-2014-0160583.

* cited by examiner

METHOD AND APPARATUS FOR PROCESSING A SOME/IP STREAM THROUGH INTERWORKING WITH AVB TECHNOLOGY

CLAIM OF PRIORITY

This application claims the benefit of Korean Patent Application No. 10-2014-0160583, filed on Nov. 18, 2014, which is hereby incorporated by reference as if fully set forth herein.

BACKGROUND OF THE INVENTION

Field of the Invention

The present invention relates to a method and apparatus for processing a Service Oriented Middleware over Internet Protocol (SOME/IP) stream, and more particularly, to a method and apparatus for processing a SOME/IP stream through interworking with Audio Video Bridging (AVB) technology in which, during a SOME/IP service processing procedure in an in-vehicle network, transmission of a stream interworks with an AVB function so that the Quality of Service (QoS) of the SOME/IP service stream may be guaranteed.

Discussion of the Related Art

Recent rapid development of IT greatly influences the automobile industry and various IT techniques are applied to vehicles.

Thereby, to support various functions, an in-vehicle communication network becomes more complex, and various communication schemes are applied to perform effective communication between vehicle controllers.

Recently, controller area network (CAN) and local interconnect network (LIN) are mainly used as bus communication systems currently applied to vehicles.

Further, as the number of controllers loaded in a vehicle increases and the amount of information exchanged between the controllers increases, a wider bandwidth and a more stable communication environment are required and thus, communication interfaces, such as FlexRay and Media Oriented System Transport (MOST), are used in in-vehicle communication.

Further, Ethernet communication, which is 100 or more times faster than CAN 100, is attracting attention as a new in-vehicle communication method.

In-vehicle Ethernet is expected to be used as a system network in mass-produced vehicles, and it is possible to economically transmit a camera image in a vehicle at a speed of 100 MBit/s through Unshielded Twisted Pair (UTP) connection. Such technology is known as BroadR-Reach and is standardized by the OPEN Alliance SIG consortium.

In-vehicle networks have been changed so as to be based Ethernet communication, and the goal in the art is to use in-vehicle networks as networks for infotainment and driver support systems up to 2015. Some OEMs expect that Ethernet will be a backbone from 2018.

BMW has developed a serialization protocol named Service Oriented Middleware over Internet Protocol (SOME/IP). SOME/IP is used to confirm whether or not a service of an electronic control unit (ECU) in a vehicle is available through a service discovery (SD) protocol. Further, SOME/IP is used to discover a service and register an event in the ECU.

SOME/IP together with Audio Video Bridging (AVB) is defined on an AUTOSAR system architecture, but a procedure of transmitting a layer 2 stream to be transmitted through SOME/IP service (for example, front and rear cameras and a navigation system) while guaranteeing a QOS through AVB technology is not defined. According to currently defined SOME/IP, a stream to be transmitted may be processed only through Transmission Control Protocol (TCP) or User Datagram Protocol (UDP).

SUMMARY OF THE INVENTION

Accordingly, the present invention is directed to a method and apparatus for processing a SOME/IP stream through interworking with AVB technology that substantially obviates one or more problems due to limitations and disadvantages of the related art.

An object of the present invention is to provide a method and apparatus for processing a SOME/IP stream through interworking with AVB technology.

Another object of the present invention is to provide a method and apparatus for processing a SOME/IP stream through interworking with AVB technology in which, during SOME/IP service processing procedure in an in-vehicle network, transmission of a layer 2 stream interworks with an AVB function so that the QoS of the SOME/IP service stream may be guaranteed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing a Service Oriented Middleware over Internet Protocol (SOME/IP) stream through interworking with Audio Video Bridging (AVB) in a server includes determining a transmission scheme for the SOME/IP stream through a SOME/IP service discovery procedure and generating an InitialEvent message and transmitting the generated InitialEvent message to a client according to the determined transmission scheme. If the determined transmission scheme is L2-Frame, the SOME/IP stream is transmitted through a layer 2 of AVB.

In another aspect of the present invention, a method for processing a Service Oriented Middleware over Internet Protocol (SOME/IP) stream through interworking with Audio Video Bridging (AVB) in a client interworking with a server includes determining a transmission scheme for the SOME/IP stream through a SOME/IP service discovery procedure and receiving an InitialEvent message corresponding to the determined transmission scheme from the server. If the determined transmission scheme is L2-Frame, the SOME/IP stream is transmitted through a layer 2 of AVB.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. The suffixes "module" and "unit" in elements used in the description below are given or used together only in consideration of ease in preparation of the specification and do not have distinctive meanings or functions.

Hereinafter, although one embodiment of the present invention illustrates all elements as being combined, embodiments of the present invention are not limited thereto. That is, one or more of all the elements may be selectively combined within the scope of the invention. Further, all the elements may be respectively implemented by independent pieces of hardware, or some of the elements may be selectively combined and thus implemented by a computer program having a program module performing the functions of the combined elements in a plurality of pieces of hardware. Code and code segments constituting the computer program may be easily deduced by those skilled in the art. Such a computer program is stored in a computer readable storage medium, and read and executed by a computer, thus being capable of implementing embodiments of the present invention. Storage media of computer programs may include a magnetic recording medium, an optical recording medium, a carrier wave medium, etc.

Further, it will be understood that the terms "including", "constituting", or "having" in the description mean that a corresponding element may be included and other elements than the element may be further included. It will be understood that all terms including technical or scientific terms have the same meanings as generally understood by those skilled in the art. Generally used terms, such as the terms defined in a dictionary, may be interpreted as having meanings coinciding with the meanings used in the art, and may not be interpreted as having ideal or excessively formal meanings.

Further, in description of elements of the present invention, the terms "first", "second", "A", "B", "(a)", "(b)", etc. may be used. These terms are used only to discriminate one element from other elements, and the nature, order, or sequence of the corresponding element is not limited by these terms. If it is stated that an element is "connected to", "combined with", or "coupled with" another element, it will be understood that the former may be directly connected to or combined with the latter or other elements may be interposed between the two elements.

Figure 1:
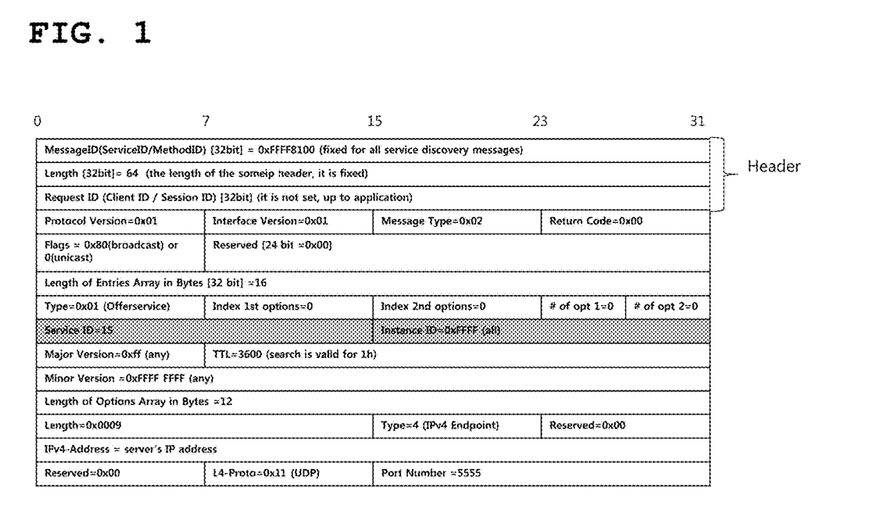
FIG. 1 is a view illustrating a conventional SOME/IP message format.

FIG. 1 is a view illustrating a conventional SOME/IP message format.

SOME/IP is an Ethernet communication protocol between a vehicle Audio Video Navigation system (AVN) system and an electronic control unit (ECU) and transmits data through server/client processing of a TCP/IP.

In SOME/IP, whether or not a service in a vehicle is available may be confirmed through a Service Discovery (SD) protocol. Further, SOME/IP may be used in service discovery and event registration in the ECU. Which transmission protocol is used to transmit, receive and process data may be determined in service discovery. For example, usable transmission protocols may include Transmission Control Protocol (TCP) and User Datagram Protocol (UDP).

FIG. 1 illustrates a structure of a SOME/IP message. A server transmits kinds of services which may be provided by the server (for example, front and rear cameras and a navigation system) to clients through service IDs, and a client requiring a service registers an instance ID through service request and thus receives the desired service.

Figure 2:
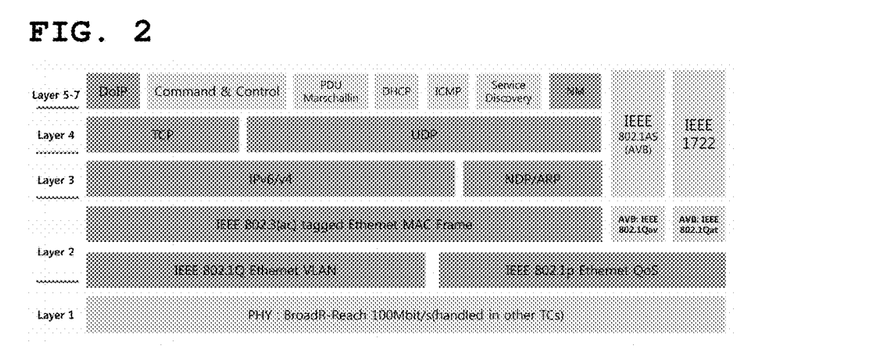
FIG. 2 is a view illustrating conventional AUTOSAR OS software stacks.

FIG. 2 is a view illustrating conventional AUTOSAR OS software stacks.

In more detail, FIG. 2 illustrates configurations of software necessary in SOME/IP and Audio Video Bridging (AVB) on an AUTOSAR OS, which are segmented according to OSI layers.

In general, in case of the AUTOSAR system, a server may identify a client which will receive a corresponding service via service discovery through SD and transmit a corresponding service stream to the identified client through TCP and UDP.

However, recently, when a service is discovered through SD of SOME/IP and then transmitted, SOME/IP is separately operated without interworking with the AVB. Further, although AVB guaranteeing a QOS is defined, a method for interworking the AVB with SOME/IP so as to be applied to an actual system is not clearly defined in the standard.

Figure 3:
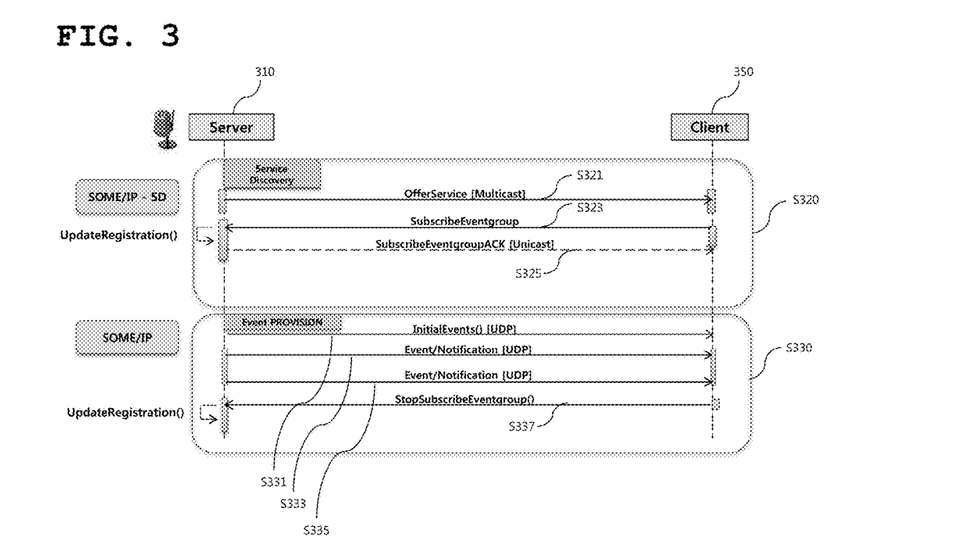
FIG. 3 is a flowchart illustrating a conventional SOME/IP service provision procedure.

FIG. 3 is a flowchart illustrating a conventional SOME/IP service provision procedure.

In a service discovery (SD) procedure S320, a server 310 transmits an OfferService message including service IDs indicating kinds of services which may be provided by the server 310 to a client 350 using a multicast scheme (Operation S321).

Thereafter, the client 350 confirms the service IDs included in the OfferService message and, if there is a service necessary for the client 350, transmits a SubscribeEventgroup message including the IP address and port number of the client 310 to the server 310 (Operation S323).

The server 310 transmits a SubscribeEventgroupACK message to the client 350 using a unicast scheme in response to the SubscribeEventgroup message (Operation S325).

Thereafter, the server 310 may provide a substantial service stream to the client 350 through UDP in an event provision procedure 330.

In the event provision procedure 330, the server 310 transmits an InitialEvent message to the client 350 and then transmits an Event/Notification message to the client 350 whenever an event occurs (Operations S331 to S335). The transmission protocol used in transmission of the InitialEvents message and the Event/Notification message may be UDP, as exemplarily shown in FIG. 3.

If the client 350 does not require a service requested to the server 310 anymore, the client 350 may transmit a Stop-SubscribeEventgroup message to stop transmission of the service stream to the server 310 (Operation S337).

Figure 4:
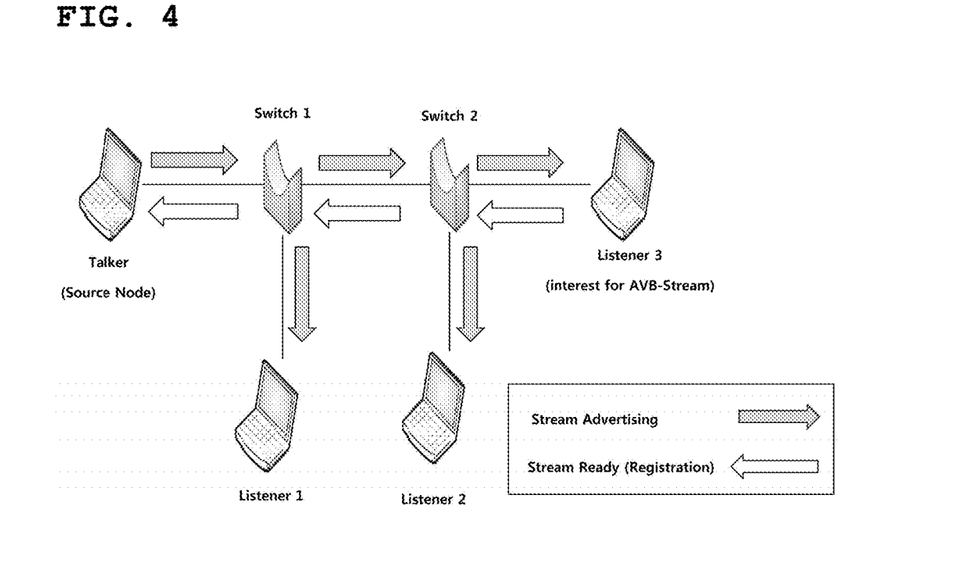
FIG. 4 is a view illustrating a conventional resource reservation procedure in IEEE 802.1Qat.

FIG. 4 is a view illustrating a conventional resource reservation procedure in IEEE 802.1Qat.

Among AVB technology, IEEE 802.1Qat is a standard regarding a Multiple Stream Reservation Protocol (MSRP) to guarantee the QoS of real time traffic in an Ethernet environment and, detailed specifications of a resource reservation method for providing a QoS guaranteed stream end-to-end, for example, between bridges/switches and terminals, are defined. Particularly, MSRP defines the concept of streaming in a layer 2 (data link layer) in the OSI model. In IEEE 802.1Qat, a terminal transmitting a resource or a stream is defined as a talker (source node), a terminal desiring to receive a resource or a stream is defined as a listener, and the talker and the listener perform a resource reservation procedure using signaling (advertising and ready) messages.

FIG. 4 illustrates an example of resource reservation using signaling (advertising and ready) messages. The advertising and ready messages used in resource reservation include information, such as a stream ID to identify a specific stream, Data frame priority classifying VLAN IDs of all frames, a Rank used in bandwidth contention, and a Traffic Specification (Tspec) indicating the size of a service. The Rank indicating importance of the corresponding stream and, for example, importance of streams, such as 911 call and safety announcements, may be set to be higher than importance of other general streams.

With reference to FIG. 4, the talker having data, which will be transmitted, transmits an advertising message to all listeners. Among listeners having received the advertising message through switches, a listener desiring to receive data sets stream reception and transmits a ready message to reserve a bandwidth. The ready message reserves the bandwidth of the switches through which the ready message passes to be transmitted to the talker, i.e., allocates the bandwidth of the switches necessary for transmission of the corresponding stream. When the ready message transmitted by the listener is registered in the talker, the talker starts to transmit a data stream.

The above-described Tspec information is information regarding the expected size of the stream generated from the talker and is used for calculation of a bandwidth necessary when data is transmitted through switches or gateways and allocation of bandwidth necessary in the switches. The Tspec information includes Bandwidth/second and Frame Rate/second information. Therethrough, each switch may guarantee the QoS of a specific reserved stream. If the size of a stream which the talker desires to transmit exceeds the spare area of a bandwidth which switches may provide, the talker and the listener receive a reservation failure message indicating that reservation is not properly carried out and stream reservation is stopped.

Figure 5:
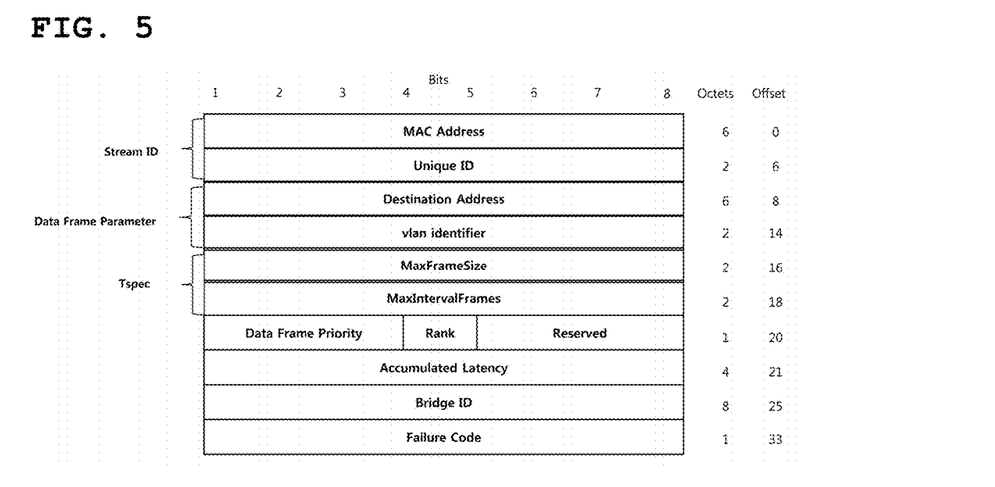
FIG. 5 is a view illustrating the structure of a conventional reservation message defined in IEEE 802.1Qat.

FIG. 5 is a view illustrating the structure of a conventional reservation message defined in IEEE 802.1Qat.

In more detail, FIG. 5 illustrates the structure of an advertising message transmitted by the talker.

With reference to FIG. 5, the advertising message includes a Stream ID, a Data Frame Parameter and a Tspec, respectively having a length of 8 bytes, Data Frame Priority having a length of 3 bits, a Rank having a length of 5 bits at maximum, an Accumulated Latency having a length of 4 bytes, a Bridge ID having a length of 8 bytes, and a Failure Code having a length of 1 byte.

Here, the Stream ID includes a MAC Address to record the MAC address of the talker and a Unique ID of 2 bytes.

The Data Frame Parameter includes a Destination Address of 6 bytes to record the MAC address of a destination node, which will receive a corresponding stream, and a VLAN Identifier of 2 bytes.

The Tspec includes a MaxFrameSize of a length of 2 bytes indicating the maximum number of bytes transmitted per second, i.e., a bandwidth, and MaxIntervalFrames indicating the number of frames for a unit time.

Figure 6:
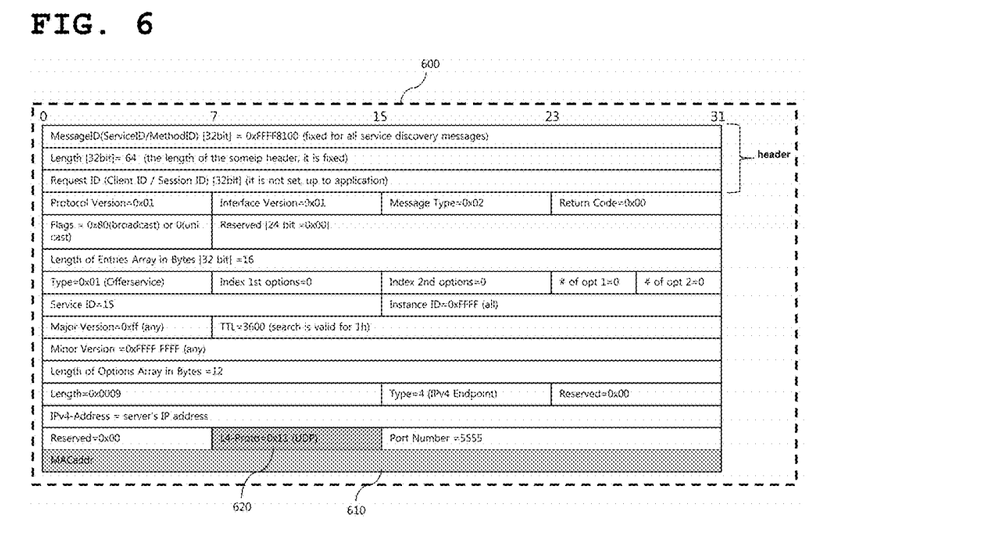
FIG. 6 is a view illustrating a SOME/IP message format for interworking with an AVB function in accordance with one embodiment of the present invention.

FIG. 6 is a view illustrating a SOME/IP message format for interworking with an AVB function in accordance with one embodiment of the present invention.

In the present invention, a message format for interworking with the AVB function is added to a SOME/IP message and thus, an AVB layer 2 stream, the QoS of which may be guaranteed, may be transmitted.

For this purpose, a SOME/IP message 600 in accordance with the present invention may add a MAC address (MACaddr) 610 for interworking with a layer 2 AVB function to the conventional SOME/IP message 100 of FIG. 1.

Therefore, a server may add the MAC address information of a corresponding client to the SOME/IP message 600 so that a service stream may be transmitted to the client through an L2-frame of an AVB layer 2.

A field of L4-Proto 620 included in the SOME/IP message 600 is a field to identify a transmission protocol which will be used to transmit a requested data stream, after the SD procedure has been completed. Transmission protocols conventionally defined in SOME/IP include only UDP and TCP. For example, values of L4-Proto 620 corresponding to UDP and TCP may be defined as 0x11 and 0x01.

In the present invention, L2-SRP (0x21) indicating layer 2 stream transmission to L4-Proto 620 may be newly defined so that SOME/IP stream may be transmitted to the layer 2 through interworking with the AVB so as to guarantee the QoS.

Therefore, the listener may confirm the value of the field of L4-Proto 620 included in a received InitialEvent message and thus confirm through which transmission scheme the corresponding stream will be transmitted.

A listener in accordance with one embodiment of the present invention may support SOME/IP but may not support AVB. In this case, if the listener receives an InitialEvent message informing of L2-frame transmission based on AVB, i.e., if the value of the field of L4-Proto 620 is set to L2-SRP, the listener may transmit a ready message including a designated Failure Code indicating that the AVB is not supported to the talker.

At this time, the talker may confirm that L2-frame reception in the corresponding listener is disabled through the received Failure Code, converts a requested service stream into a TCP or UDP mode other than AVB transmission, i.e., L2-frame transmission, and then transmits the converted stream to the listener.

In accordance with another embodiment of the present invention, transmission schemes according to types of provided services may be defined in advance and maintained in the talker. In this case, when a service requested by a listener is confirmed through the SD procedure, the talker may transmit a corresponding service stream using a transmission scheme corresponding to such a requested service.

For example, a higher reliable AVB transmission scheme, i.e., a layer 2 transmission scheme, may be applied to a high-speed real time image data stream, and a layer 4 transmission scheme, such as UDP or TCP by SOME/IP, may be applied to low-speed data.

Figure 7:
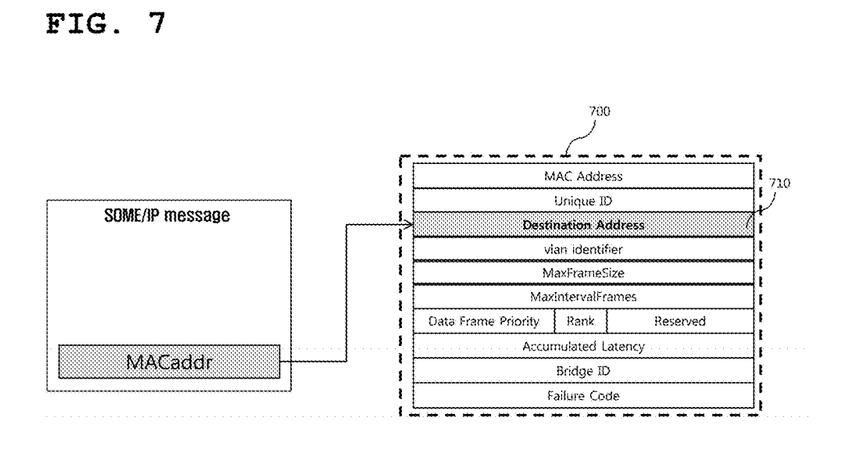
FIG. 7 is a view illustrating a method for interworking with AVB technology for a SOME/IP stream in accordance with one embodiment of the present invention.

FIG. 7 is a view illustrating a method for interworking with AVB technology for SOME/IP stream transmission in accordance with one embodiment of the present invention.

The server in accordance with the present invention may acquire the IPv4 address and a port number of a client and additionally acquire the MAC address (MACaddr) 610 of the client, through the SD procedure.

When the MAC address of the client through the SD procedure is acquired, the server may transmit a SOME/IP service stream to the client through an AVB-based layer 2 frame, hereinafter, simply referred to as an L2-Frame.

With reference to FIG. 7, the server may acquire the MAC address of the client through the SD procedure, record the acquired MAC address in a reservation message 700 for reservation of the stream, i.e., the field of a Destination Address 710 of the advertising message, and transmit the reservation message 700 to the corresponding client.

With reference to FIG. 4, a conventional Qat reservation procedure includes an advertising procedure of finding out a service receiver requiring reserved transmission from a plurality of unspecified listeners through MAC broadcast and a ready procedure of acquiring the MAC address of the receiver and simultaneously allocating a necessary bandwidth of switches located on a transmission route.

However, in SOME/IP stream transmission scheme through interworking with the AVB in accordance with the present invention, the server confirms in advance a client requiring service reception and the MAC address information of the corresponding client through the SD procedure of SOME/IP and thus, the stream reservation procedure of AVB does not require a separate client MAC address acquisition procedure.

Further, in the present invention, transmission priorities of AVB streams may be allocated to the SOME/IP stream having the same characteristics through the AVB stream reservation allocation procedure and thus, the QoS may be guaranteed through a wider variety of schemes. For example, various QoS services may be provided by granting different priorities to the front camera, the rear camera and the navigation system transmitting multimedia data according to vehicle safety requirements.

Figure 8:
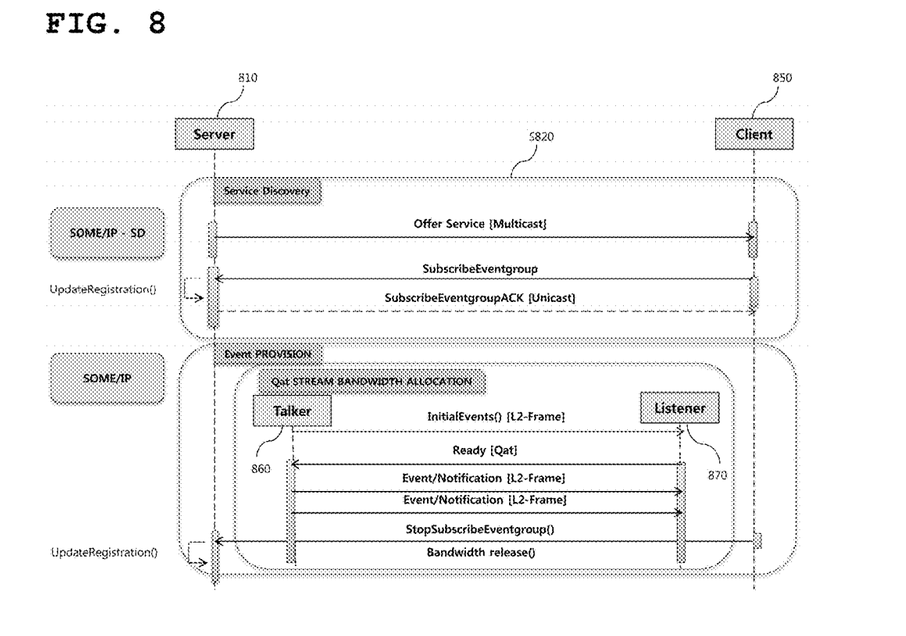
FIG. 8 is a flowchart illustrating a SOME/IP stream provision procedure through interworking with the AVB function in accordance with one embodiment of the present invention.

FIG. 8 is a flowchart illustrating a SOME/IP stream provision procedure through interworking with the AVB function in accordance with one embodiment of the present invention.

In more detail, FIG. 8 illustrates an overall function interworking procedure from an SD procedure in SOME/IP to transmission and termination of an event through interworking with AVB.

With reference to FIG. 8, when a SOME/IP SD procedure S820 has been completed, a server 810 transmits an InitialEvent message transmitting a service stream to the MAC address of a client 850. During such a process, the client 850 may detect the maximum frame size (MaxFrameSize) of the transmitted stream and detect the maximum frame transmission period (MaxIntervalFrames) according to kinds of service (SR-class A, B). The above-described two values are necessary to allocate the bandwidth of switches through reservation message transmission and are referred to as Tspec information. Thereafter, the server 810 is operated as a talker 860 and the client 850 is operated as a listener 870, the talker 860 transmits one stream to the listener 870 through an InitialEvent message, and the listener 870 transmits a ready message to the talker 860 via switches through which the stream passes so that the bandwidth of the respective switches may be allocated.

When the talker 860 successfully receives the ready message, the talker 860 recognizes that stream reservation is normally performed and starts reserved transmission. That is, the talker 860 may generate an Event/Notification message and transmit the Event/Notification message to the listener 870 whenever a stream to be transmitted is present.

If the client 850 desires service termination, the client 850 may transmit a StopSubscribeEventgroup message to the server 810 to request stop of transmission of the corresponding service stream. Thereafter, the server 810 may perform a bandwidth cancellation procedure of cancelling the bandwidth allocated to the switches in which stream reservation is stopped according a Qat standard procedure.

Particularly, the talker 860 in accordance with the present invention may perform reserved transmission of the stream through interworking with the AVB by transmitting an InitialEvent message including the MAC address information of the client 850 and L2-SRP information informing of AVB L2-frame transmission to the listener 870. Here, the IntialEvent message may include Tspec information necessary for reserved transmission of the stream and an Advertising message including the Tspec information. The listener 870 may receive the bandwidth reserved and allocated to switches located on a transmission path of the corresponding service stream by transmitting a Ready message including the received Tspec information to the talker 860.

If the value of the field of L4-Proto 620 included in the InitialEvent message is set to L2-SRP and the client 850 does not support the AVB function, the client 850 may transmit a StopSubscribeEventgroup message, including a designated Fault Code announcing that L2-Frame reception is disabled, to the server 810.

Thereafter, the server 810 may set the value of the field of L4-Proto 620 as a value corresponding to UDP or TCP and then transmit an InitialEvent message to the client 850 so that the corresponding service stream may be transmitted through UDP or TCP.

In accordance with another embodiment of the present invention, the client 850 may set the value of the field of L4-Proto 620 of the SubscribeEventGroup message to L2-SRP during SD and request that the server 810 transmit the stream through the L2-Frame through interworking with the AVB. Thereafter, the server 810 may allocates a Qat stream bandwidth according to request of the client 850, generate an InitialEvent message in which the value of L4-Proto 620 is set to L2-SRP, and transmit the generated InitialEvent message to the client 850. Therefore, the server 810 may transmit a service stream, the subscription to which is requested by the client 850, through the L2-frame which may guarantee the QoS.

In accordance with one embodiment of the present invention, the server 810 may transmit an OfferService message to the client 850 to inform the client of available services and the client 850 may send a request for subscription to a corresponding service to the server 810 through the SubscribeEventgroup message. Here, the server 810 may inform the client 850 of which transmission scheme is used to transmit the stream of the available service through L4-Proto 620 included in the OfferService message.

In accordance with another embodiment of the present invention, the client 850 may judge which transmission scheme is used to receive a service stream, the subscription to which will be requested, and transmit a result of judgment to the server 810 through L4-Proto 620 of the SubscribeEvent group message.

In accordance with yet another embodiment of the present invention, the server 810 may keep a table stating transmission schemes according to designated services in which transmission schemes according to provided services are defined in advance and, when the server 810 receives a request for a subscription to a specific service from the client 850, determine a value of L4-Proto 620 corresponding to the requested service with reference to the table.

Figure 9:
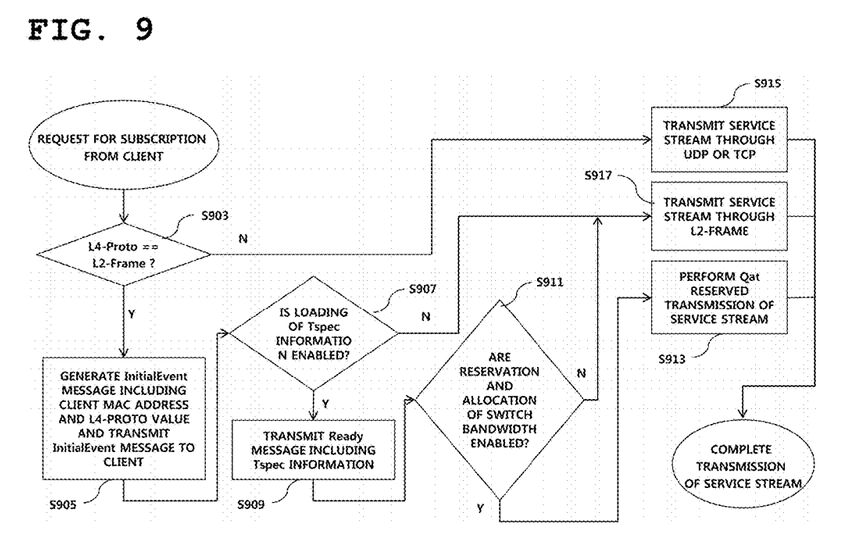
FIG. 9 is a flowchart illustrating a SOME/IP stream provision procedure through interworking with the AVB function in accordance with one embodiment of the present invention.

FIG. 9 is a flowchart illustrating a SOME/IP stream provision procedure through interworking with the AVB function in accordance with one embodiment of the present invention.

When the server 810 receives a request for a subscription to a specific service from the client 850, the server 810 confirms whether or not the value of L4-Proto 620 corresponding to the requested service is L2-Frame, i.e., L2-SRP (Operation S903).

If the value of L4-Proto 620 corresponding to the requested service is L2-Frame, the server 810 generates an InitialEvent message in which the MAC address of the client 850 is included and the value of L4-Proto 620 is set to L2-Frame and transmits the generated InitialEvent message to the client 850 for reserved transmission of the stream through interworking with the AVB function (Operation S905). Here, the server 810 may determine Tspec information of the service, the subscription to which is requested, and transmit the InitialEvent message, including the determined Tspec information or an AVB advertising message including the determined Tspec information, to the client 850.

The client 850 confirms whether or not loading of the Tspec information from the received InitialEvent message is enabled (Operation S907). As a result of confirmation, if loading of the Tspec information is enabled, the client 850 may transmit a Ready message including the loaded Tsepc information to the server 810 (Operation S909).

When the server 810 receives the Ready message, the server 810 judges whether or not reservation and allocation of a bandwidth to switches are enabled (Operation S911). As a result of judgment, if reservation and allocation of the bandwidth to switches are enabled, the server 810 performs reserved transmission of the corresponding service stream through reservation and allocation of the bandwidth in Qat (Operation S913).

If the value of L4-Proto 620 is not L2-Frame in Operation S903 above, the server 810 transmits the corresponding service stream to the client 850 through TCP or UDP (Operation S915).

Further, if loading of the Tspec information from the received InitialEvent message is not enabled and the value of L4-Proto 620 is L2-Frame, as a result of confirmation, in Operation S907 above, the client 850 does not perform a separate stream reservation procedure, i.e., does not transmit the Ready message to the server 810, and may receive a layer 2 frame (L2-frame) from the server 810.

As apparent from the above description, a method and apparatus in accordance with the present invention will have effects, as follows.

First, the present invention provides a method and apparatus for processing a SOME/IP stream through interworking with AVB technology.

Second, the present invention provides a method and apparatus for processing a SOME/IP stream through interworking with AVB technology in which, during a SOME/IP service processing procedure in an in-vehicle network, an AVB function is applied to transmission of a layer 2 stream so that the QoS of the SOME/IP service stream may be guaranteed.

Third, the present invention provides a method and apparatus for processing a SOME/IP stream through interworking with AVB technology in which loss of audio and video streams generated through UDP transmission in conventional SOME/IP may be prevented and a QOS may be guaranteed through setting of priorities between SOME/IP streams.

Fourth, the present invention provides a method and apparatus for processing a SOME/IP stream through interworking with AVB technology in which loss of audio and video streams generated through UDP transmission may be prevented and a QOS may be guaranteed through setting of priorities between SOME/IP streams.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for processing a Service Oriented Middleware over Internet Protocol (SOME/IP) stream through interworking with Audio Video Bridging (AVB) in a server, the method comprising steps of:
   determining a transmission scheme for the SOME/IP stream through a SOME/IP service discovery procedure;
   reserving and allocating a bandwidth information required for transmission of the SOME/IP stream through a layer 2 of AVB if the determined transmission scheme is an L2-Frame;
   generating an InitialEvent message including the reserved and allocated bandwidth information; and
   transmitting the generated InitialEvent message to a client according to the determined transmission scheme,
   wherein, when the determined transmission scheme is the L2-Frame and the server receives a ready message including the reserved and allocated bandwidth information from the client, the SOME/IP stream is transmitted through the layer 2 of AVB.

2. The method according to claim 1, wherein, after the determined transmission scheme is recorded in an L4-Proto field of the InitialEvent message, the InitialEvent message is transmitted to the client.

3. The method according to claim 1, wherein the layer 2 is a data link layer performing AVB stream reserved transmission.

4. The method according to claim 1, wherein the SOME/IP service discovery procedure includes:
   transmitting an OfferService message, including service information provided by the server, to the client; and
   receiving an SubscribeEventgroup message including service information, subscription to which is requested by the client, and MAC address information of the client from the client, wherein the InitialEvent message includes the MAC address information.

5. The method according to claim 4, wherein the determined transmission scheme is transmitted to the client through the L4-Proto field of the OfferService message.

6. The method according to claim 4, wherein the transmission scheme corresponding to a service, the subscription to which is requested, through the L4-Proto field of the SubscribeEventgroup message is determined by the client and transmitted to the server,
wherein the server determines the transmission scheme based on the SubscribeEventgroup message.

7. The method according to claim 4, wherein transmission schemes according services provided by the server are defined in a table stating transmission schemes according to services and the transmission scheme corresponding to the service, the subscription to which is requested, is determined with reference to the table stating transmission schemes according to services.

8. The method according to claim 1, wherein, if the determined transmission scheme is not the L2-Frame, the SOME/IP stream is transmitted to the client through a layer 4 transmission scheme of SOME/IP.

9. The method according to claim 8, wherein the layer 4 transmission scheme includes at least one of Transmission Control Protocol (TCP) and User Datagram Protocol (UDP).

10. A method for processing a Service Oriented Middleware over Internet Protocol (SOME/IP) stream through interworking with Audio Video Bridging (AVB) in a client interworking with a server, the method comprising steps of:
determining a transmission scheme for the SOME/IP stream through a SOME/IP service discovery procedure;
receiving an InitialEvent message including bandwidth information reserved and allocated by the server corresponding to the determined transmission scheme from the server; and
transmitting a ready message including the reserved and allocated bandwidth information if the determined transmission scheme is an L2-Frame,
wherein, when the determined transmission scheme is the L2-Frame and the server receives the ready message from the client, the SOME/IP stream is transmitted through a layer 2 of AVB.

11. The method according to claim 10, wherein the determined transmission scheme is recorded in an L4-Proto field of the InitialEvent message.

12. The method according to claim 10, wherein the layer 2 of AVB is a data link layer performing AVB stream reserved transmission.

13. The method according to claim 10, wherein the SOME/IP service discovery procedure includes:
receiving an OfferService message, including service information provided by the server, from the server; and
transmitting an SubscribeEventgroup message including service information, subscription to which is requested by the client, and MAC address information of the client to the server,
wherein the InitialEvent message includes the MAC address information.

14. The method according to claim 13, wherein the determined transmission scheme is received by the client through the L4-Proto field of the OfferService message.

15. The method according to claim 13, wherein the transmission scheme corresponding to a service, the subscription to which is requested, is determined and transmitted to the server through the SubscribeEventgroup message,
wherein the server determines the transmission scheme based on the SubscribeEventgroup message.

16. The method according to claim 10, wherein, if the determined transmission scheme is not the L2-Frame, the SOME/IP stream is received by the client through a layer 4 transmission scheme of SOME/IP.

17. The method according to claim 16, wherein the layer 4 transmission scheme includes at least one of Transmission Control Protocol (TCP) and User Datagram Protocol (UDP).

18. A non-transitory computer readable recording medium having a program recorded therein to implement the method according to claim 10.

19. A non-transitory computer readable recording medium having a program recorded therein to implement the method according to claim 1.

* * * * *